US011212838B2

(12) United States Patent
Pelletier et al.

(10) Patent No.: US 11,212,838 B2
(45) Date of Patent: Dec. 28, 2021

(54) METHOD AND APPARATUS FOR TRANSMITTING UPLINK DATA ON UPLINK RESOURCES

(71) Applicant: Pantech Wireless, LLC, Cedar Park, TX (US)

(72) Inventors: Benoit Pelletier, Roxboro (CA); Diana Pani, Montreal (CA); Rocco DiGirolamo, Laval (CA); Christopher R. Cave, Dollard-des-Ormeaux (CA); Vincent Roy, Longueuil (CA); Paul Marinier, Brossard (CA); Eldad M. Zeira, Huntington, NY (US)

(73) Assignee: Pantech Wireless, LLC, Cedar Park, TX (US)

( * ) Notice: Subject to any disclaimer, the term of this patent is extended or adjusted under 35 U.S.C. 154(b) by 0 days.

(21) Appl. No.: 16/421,019

(22) Filed: May 23, 2019

(65) Prior Publication Data

US 2019/0281638 A1  Sep. 12, 2019

Related U.S. Application Data

(63) Continuation of application No. 14/876,337, filed on Oct. 6, 2015, now Pat. No. 10,306,677, which is a (Continued)

(51) Int. Cl.
*H04W 74/08* (2009.01)
*H04W 72/12* (2009.01)
(Continued)

(52) U.S. Cl.
CPC ....... *H04W 74/0833* (2013.01); *H04L 1/1812* (2013.01); *H04L 5/0053* (2013.01);
(Continued)

(58) Field of Classification Search
CPC ..... H04L 5/001; H04L 5/0053; H04L 5/0091; H04L 1/1812; H04L 5/0055;
(Continued)

(56) References Cited

U.S. PATENT DOCUMENTS 6,167,248 A   12/2000  Hamalainen et al.
6,246,692 B1   6/2001  Dai et al.
(Continued)

FOREIGN PATENT DOCUMENTS

CA    2 615 915       3/2004
CN    1777080 A       5/2006
(Continued)

OTHER PUBLICATIONS

Ericsson, "Contention resolution for enhanced uplink in CELL_FACH," 3GPP TSG RAN WG2 #60bis, R2-080043, Sevilla, Spain (Jan. 14-18, 2008).
(Continued)

*Primary Examiner* — Kan Yuen
(74) *Attorney, Agent, or Firm* — Volpe Koenig

(57) ABSTRACT

A method and an apparatus is provided for transmitting uplink data on uplink resources. The method and apparatus includes receiving a radio resource control (RRC) message indicating uplink resources for wireless transmit/receive unit (WTRU) and medium access control (MAC) timer information, transmitting uplink data based on the indicated uplink resources, and deactivating the indicated uplink resources in response to a MAC timer expiring, wherein the MAC timer is configured based on the MAC timer information.

10 Claims, 9 Drawing Sheets

Related U.S. Application Data continuation of application No. 14/319,608, filed on Jun. 30, 2014, now Pat. No. 9,313,809, which is a continuation of application No. 12/238,910, filed on Sep. 26, 2008, now Pat. No. 8,774,104.

(60) Provisional application No. 60/975,985, filed on Sep. 28, 2007, provisional application No. 60/982,528, filed on Oct. 25, 2007, provisional application No. 61/018,999, filed on Jan. 4, 2008, provisional application No. 61/025,441, filed on Feb. 1, 2008, provisional application No. 61/038,576, filed on Mar. 21, 2008, provisional application No. 61/074,288, filed on Jun. 20, 2008, provisional application No. 61/083,409, filed on Jul. 24, 2008.

(51) Int. Cl.
*H04W 72/04* (2009.01)
*H04W 76/27* (2018.01)
*H04W 76/38* (2018.01)
*H04W 28/04* (2009.01)
*H04L 5/00* (2006.01)
*H04L 1/18* (2006.01)
*H04W 88/08* (2009.01)

(52) U.S. Cl.
CPC ........... *H04L 5/0055* (2013.01); *H04W 28/04* (2013.01); *H04W 72/04* (2013.01); *H04W 72/0406* (2013.01); *H04W 72/12* (2013.01); *H04W 76/27* (2018.02); *H04W 76/38* (2018.02); *H04W 88/08* (2013.01)

(58) Field of Classification Search
CPC ......... H04W 52/0216; H04W 72/0413; H04W 72/1273; H04W 76/27; H04W 76/28; H04W 76/20; H04W 28/04; H04W 72/04; H04W 72/0406; H04W 72/12; H04W 74/0833; H04W 76/38; H04W 88/08; Y02D 70/00; Y02D 70/1262; Y02D 70/142; Y02D 70/24; Y02D 70/25
See application file for complete search history.

(56) References Cited

U.S. PATENT DOCUMENTS

| | | | |
|---|---|---|---|
| 6,721,566 B2 | 4/2004 | Longoni et al. | |
| 6,845,238 B1 | 1/2005 | Muller | |
| 7,079,489 B2 | 7/2006 | Massie et al. | |
| 7,145,889 B1 | 12/2006 | Zhang et al. | |
| 7,406,314 B2 | 7/2008 | Sharma | |
| 7,477,609 B2 | 1/2009 | Agin | |
| 7,480,269 B2 | 1/2009 | Heo et al. | |
| 7,508,792 B2 | 3/2009 | Petrovic et al. | |
| 7,643,419 B2 | 1/2010 | Terry et al. | |
| 7,643,515 B2 | 1/2010 | Willenegger | |
| 7,890,094 B2 | 2/2011 | Iwamura | |
| 7,894,390 B2 | 2/2011 | Nakamata et al. | |
| 8,072,932 B2 | 12/2011 | Sun et al. | |
| 8,175,604 B2 | 5/2012 | Lohr et al. | |
| 8,259,752 B2 | 9/2012 | Terry et al. | |
| 8,989,082 B2 | 3/2015 | Wigard et al. | |
| 9,844,093 B2 | 12/2017 | Pani et al. | |
| 9,979,514 B2 | 5/2018 | Tseng | |
| 2002/0009774 A1 | 7/2002 | Choi et al. | |
| 2002/0097740 A1* | 7/2002 | Choi | H04W 36/10 370/441 |
| 2003/0223452 A1 | 12/2003 | Toskala et al. | |
| 2004/0052229 A1 | 3/2004 | Terry et al. | |
| 2004/0068505 A1 | 4/2004 | Lee et al. | |
| 2004/0117860 A1 | 6/2004 | Yi et al. | |
| 2005/0026623 A1 | 2/2005 | Fisher | |
| 2005/0053035 A1 | 3/2005 | Kwak et al. | |
| 2005/0054298 A1 | 3/2005 | Chen | |
| 2005/0101299 A1 | 5/2005 | Farnsworth | |
| 2005/0180371 A1 | 8/2005 | Malkamaki et al. | |
| 2005/0249163 A1 | 11/2005 | Kim et al. | |
| 2005/0250504 A1 | 11/2005 | Mikola | |
| 2005/0265301 A1 | 12/2005 | Heo et al. | |
| 2005/0281219 A1 | 12/2005 | Kim et al. | |
| 2006/0023629 A1 | 2/2006 | Kim et al. | |
| 2006/0026490 A1 | 2/2006 | Rinne et al. | |
| 2006/0039326 A1 | 2/2006 | Jeong et al. | |
| 2006/0092876 A1 | 5/2006 | Kwak et al. | |
| 2006/0116118 A1 | 6/2006 | Charriere et al. | |
| 2006/0140154 A1 | 6/2006 | Kwak et al. | |
| 2006/0142032 A1 | 6/2006 | Derakhshan et al. | |
| 2006/0164993 A1* | 7/2006 | Teague | H04W 76/25 370/235 |
| 2006/0165045 A1 | 7/2006 | Kim et al. | |
| 2006/0172739 A1 | 8/2006 | Wigard et al. | |
| 2006/0182065 A1 | 8/2006 | Petrovic et al. | |
| 2006/0251027 A1 | 11/2006 | Chun et al. | |
| 2006/0280145 A1 | 12/2006 | Revel et al. | |
| 2007/0047445 A1 | 3/2007 | Usuda et al. | |
| 2007/0047451 A1 | 3/2007 | Lohr et al. | |
| 2007/0047452 A1 | 3/2007 | Lohr et al. | |
| 2007/0060142 A1 | 3/2007 | Reznik et al. | |
| 2007/0081492 A1* | 4/2007 | Petrovic | H04L 1/1812 370/331 |
| 2007/0115871 A1 | 5/2007 | Zhang et al. | |
| 2007/0135113 A1 | 6/2007 | Moinet et al. | |
| 2007/0135130 A1* | 6/2007 | Lee | H04W 72/1289 455/450 |
| 2007/0189237 A1 | 8/2007 | Jaatinen et al. | |
| 2007/0206531 A1 | 9/2007 | Pajukoski et al. | |
| 2007/0213059 A1 | 9/2007 | Shaheen | |
| 2007/0223609 A1 | 9/2007 | Obuchi et al. | |
| 2007/0230398 A1 | 10/2007 | Jiang | |
| 2008/0008152 A1 | 1/2008 | Lohr et al. | |
| 2008/0049669 A1 | 2/2008 | Lundby et al. | |
| 2008/0081651 A1 | 4/2008 | Kuroda et al. | |
| 2008/0117891 A1* | 5/2008 | Damnjanovic | H04W 72/04 370/345 |
| 2008/0125043 A1 | 5/2008 | Karmanenko et al. | |
| 2008/0130533 A1 | 6/2008 | Dettling et al. | |
| 2008/0192766 A1 | 8/2008 | Ranta-Aho et al. | |
| 2008/0194259 A1 | 8/2008 | Vujcic et al. | |
| 2008/0214225 A1 | 9/2008 | Choukroun | |
| 2008/0254804 A1 | 10/2008 | Lohr et al. | |
| 2008/0268852 A1 | 10/2008 | Petrovic et al. | |
| 2009/0010278 A1 | 1/2009 | Torsner et al. | |
| 2009/0011795 A1 | 1/2009 | Fukui et al. | |
| 2009/0046573 A1* | 2/2009 | Damnjanovic | H04W 36/30 370/216 |
| 2009/0061881 A1 | 3/2009 | Gonsa et al. | |
| 2009/0086671 A1 | 4/2009 | Pelletier et al. | |
| 2009/0088134 A1 | 4/2009 | Ishii et al. | |
| 2009/0135769 A1 | 5/2009 | Sambhwani et al. | |
| 2009/0143074 A1 | 6/2009 | Pelletier et al. | |
| 2009/0168704 A1 | 7/2009 | Lee et al. | |
| 2009/0168724 A1 | 7/2009 | Umesh et al. | |
| 2009/0196239 A1 | 8/2009 | Lee et al. | |
| 2009/0219868 A1 | 9/2009 | Lee et al. | |
| 2009/0225709 A1 | 9/2009 | Wager et al. | |
| 2009/0225739 A1 | 9/2009 | Yeo et al. | |
| 2009/0257407 A1 | 10/2009 | Park et al. | |
| 2009/0318170 A1 | 12/2009 | Lee et al. | |
| 2010/0091652 A1 | 4/2010 | Lin | |
| 2010/0098165 A1 | 4/2010 | Farfade et al. | |
| 2010/0103852 A1 | 4/2010 | Jactat | |
| 2010/0189071 A1 | 7/2010 | Kitazoe | |
| 2010/0208688 A1 | 8/2010 | Ma et al. | |
| 2010/0215005 A1 | 8/2010 | Pradas et al. | |
| 2010/0216471 A1 | 8/2010 | Meyer et al. | |
| 2010/0220624 A1 | 9/2010 | Ma et al. | |
| 2010/0278143 A1 | 11/2010 | Chun et al. | |
| 2010/0285791 A1 | 11/2010 | Pirskanen et al. | |
| 2010/0309877 A1 | 12/2010 | Damnjanovic et al. | |
| 2011/0164540 A1 | 7/2011 | Lee et al. | |

(56) References Cited

U.S. PATENT DOCUMENTS

| | | | |
|---|---|---|---|
| 2012/0327833 | A1 | 12/2012 | Kim et al. |
| 2015/0334619 | A1 | 11/2015 | Hakola et al. |
| 2018/0070403 | A1 | 3/2018 | Uemura et al. |

FOREIGN PATENT DOCUMENTS

| | | |
|---|---|---|
| GB | 2 371 179 | 7/2002 |
| JP | 2007-124493 A | 5/2007 |
| JP | 2007-525036 A | 8/2007 |
| JP | 2010-527194 | 8/2010 |
| KR | 20040089937 | 10/2004 |
| WO | 04/100598 | 11/2004 |
| WO | 05/006829 | 1/2005 |
| WO | 05/020474 | 3/2005 |
| WO | 2005/022813 A1 | 3/2005 |
| WO | 05/089050 | 9/2005 |
| WO | 05/101886 | 10/2005 |
| WO | 06/043782 | 4/2006 |
| WO | 2007/027032 | 3/2007 |
| WO | 07/048470 | 5/2007 |
| WO | 07/077250 | 7/2007 |
| WO | 07/078155 | 7/2007 |
| WO | 08/097489 | 8/2008 |
| WO | 08/137421 | 11/2008 |
| WO | 2009/019198 A1 | 2/2009 |
| WO | 2010/124228 A2 | 10/2010 |
| WO | 2013/040026 A1 | 3/2013 |

OTHER PUBLICATIONS

Ericsson, "Enhanced Uplink for CELL_FACH," 3GPP TSG RAN WG1 #50-bis, R1-073954, Shanghai, China (Oct. 8-12, 2007).
Ericsson, "Implicit release for enhanced uplink in CELL_FACH," 3GPP TSG RAN WG2 #61bis, R2-081501 (Mar. 31-Apr. 8, 2008).
Ericsson, "Resource release of common E-DCH in CELL_FACH," 3GPP TSG RAN WG2 #60bis, R2-080044 (Jan. 14-18, 2008).
Huawei, "Release procedure of E-RACH," 3GPP TSG RAN2 #60bis, R2-080262 (Jan. 14-18, 2008).
Infineon Technologies, "Multiplexing option selection in case of E_DCH_TRANSMISSION equal FALSE," 3GPP TSG-RAN WG2 Meeting #58, R2-081054, Kobe, Japan, (May 7-11, 2007).
Infineon, "CELL_FACH E-DCH scheduling simplifications," 3GPP TSG-RAN WG2 Meeting #61, R2-080894, Sorrento, Italy, (Feb. 11-15, 2008).
Infineon, "Resource release mechanisms for CELL_FACH E-DCH," 3GPP TSG-RAN WG2 Meeting #60bis, R2-080148 (Jan. 14-18, 2008).
Nokia Corporation et al., "Introduction of Enhanced Uplink in CELL_FACH in 25.319," 3GPP TSG RAN WG2 meeting #62, R2-082368, Kansas City, USA (May 5-9, 2008). (See pp. 5-7 and 30-35).
Nokia Corporation, et al., "Introduction of Uplink Enhanced CELL_FACH in 25.321 (Draft CR)", Change Request, 25.23, CR CRNum, Current Version: 8.1.0, 3GPP TSG-RAN WG2 Meeting #62, R2-082371, (Kansas City, USA, May 5-9, 2008).
Nokia et al., "CELL_FACH state E-DCH—coverage comparison," 3GPP TSG-RAN WG1 Meeting #50bis, R1-074302 (Oct. 8-12, 2007).
Nokia et al., "Enhanced CELL_FACH State with E-DCH," 3GPP TSG-RAN WG2 Meeting #59bis, R1-074300 (Oct. 8-12, 2007).
Nokia et al., "Resource assignment for E-DCH access in CELL_FACH state," 3GPP TSG-RAN WG1 Meeting #50-BIS, R1-074303 (Oct. 8-12, 2007).
Nokia Siemens Networks, "Draft CR on TS25.435 for Enhanced Uplink in CELL_FACH", Change Request, 25.435, CR, Current Version: 7.8.0, 3GPP TSG-RAN WG3 Meeting #60, R3-081276, (Kansas City, USA, May 5-9, 2008).
Nokia Siemens Networks, "Introduction of Enhanced CELL_FACH state," 3GPP TSG-2 Meeting #57, R2-071556, St. Julian's, Malta (Mar. 26-30, 2007).
Nsn et al, "Further Discussion on Enhanced CELL_FACH in REL8", 3GPP TSG-RAN WG-2 Meeting #59, R2-073254, (Athens, Greece, Aug. 20-24, 2007).
NTT Docomo, Inc., "Issues regarding persistent scheduling," 3GPP TSG RAN WG2 #59, R2-073567, Athens, Greece (Aug. 20-24, 2007).
Qualcomm Europe, "L1/2 aspects for enhanced UL for CELL_FACH," 3GPP TSG-RAN WG1 #50-bis, R1-074126 (Oct. 8-12, 2007).
Qualcomm Europe, "E-DCH Resource Release in CELL_FACH," 3GPP TSG-RAN WG3 #60, R3-081091, Kansas City, Missouri, US (May 5-9, 2008).
Qualcomm Europe, "Empty Buffer Status reporting and Implicit release for CCCH messages using enhanced uplink in CELL_FACH," 3GPP TSG-RAN WG2 #61-bis, R2-081581, Shenzhen, China (Mar. 31-Apr. 4, 2008).
Qualcomm Europe, "E-RNTI handling in Active Set Update procedure," 3GPP TSG-RAN WG 2 Meeting #51, R2-060682 (Feb. 13-17, 2006).
Qualcomm Europe, "Layer 1/2 aspects for enhanced UL for CELL_FACH," 3GPP TSG-RAN WG2 #59bis, R2-074390 (Oct. 8-12, 2007).
Third Generation Partnership Project Support Team, "Minutes of the 59bis TSG-WG2 Meeting (Shanghai, China, Oct. 8-12, 2007)", TSG-RAN WG2 meeting #60, R2-075189, (Korea Nov. 5-9, 2007).
Third Generation Partnership Project Work Area, "Enhanced Uplink for CELL_FACH State in FDD", TSG-RAN #37 Meeting, RP-070677, (Riga, Latvia, Sep. 11-14, 2007).
Third Generation Partnership Project, "Technical Specification Group Radio Access Network; Enhanced Uplink; Overall Description; Stage 2 (Release7)", 3GPP TS 25.319, V7.2.0, (Mar. 2007).
Third Generation Partnership Project, "Technical Specification Group Radio Access Network; Enhanced Uplink; Overall Description; Stage 2 (Release7)", 3GPP TS 25.319, V7.6.0, (May 2007).
Third Generation Partnership Project, "Technical Specification Group Radio Access Network; Enhanced Uplink; Overall Description; Stage 2 (Release7)", 3GPP TS 25.319, V8.3.0, (Sep. 2008).
Third Generation Partnership Project, "Technical Specification Group Radio Access Network; Physical Channels and Mapping of Transport Channels Onto Physical Channels (FDD) (Release 7)", TS 25.211, V7.3.0, (Sep. 2007).
Third Generation Partnership Project, "Technical Specification Group Radio Access Network; Physical Channels and Mapping of Transport Channels Onto Physical Channels (FDD) (Release 8)", TS 25.211, V8.2.0, (Sep. 2008).
Third Generation Partnership Project, Technical Specification Group Radio Access Network; Medium Access Control (MAC) Protocol Specification (Release 7), 3GPP TS 25.321, V7.5.0, (Jun. 2007).
Third Generation Partnership Project, Technical Specification Group Radio Access Network; Medium Access Control (MAC) Protocol Specification (Release 7), 3GPP TS 25.321, V7.10.0, (Jun. 2008).
Third Generation Partnership Project, Technical Specification Group Radio Access Network; Medium Access Control (MAC) Protocol Specification (Release 7), 3GPP TS 25.321, V8.3.0, (Sep. 2008).
Third Generation Partnership Project, "Technical Specification Group Radio Access Network; UTRAN Iur Interface User Plane Protocols for Common Transport Channel Data Streams (Release 6)," 3GPP TS 25.425 V6.4.0 (Dec. 2006).
Third Generation Partnership Project, "Technical Specification Group Radio Access Network; UTRAN Iur Interface User Plane Protocols for Common Transport Channel Data Streams (Release 6)," 3GPP TS 25.425 V6.5.0 (Sep. 2008).
Third Generation Partnership Project, "Technical Specification Group Radio Access Network; UTRAN Iur Interface User Plane Protocols for Common Transport Channel Data Streams (Release 7)," 3GPP TS 25.425 V7.8.0 (Sep. 2008).
Third Generation Partnership Project, "Technical Specification Group Radio Access Network; UTRAN Iur Interface User Plane Protocols for Common Transport Channel Data Streams (Release 8)," 3GPP TS 25.425 V8.0.0 (Sep. 2008).

(56) References Cited

OTHER PUBLICATIONS

Third Generation Partnership Project, "Technical Specification Group Radio Access Network; Medium Access Control (MAC) protocol specification (Release 1999)," 3GPP TS 25.321 V3.17.0 (Jun. 2004).
Third Generation Partnership Project, "Technical Specification Group Radio Access Network; Medium Access Control (MAC) protocol specification (Release 4)," 3GPP TS 25.321 V4.10.0 (Jun. 2004).
Third Generation Partnership Project, "Technical Specification Group Radio Access Network; Medium Access Control (MAC) protocol specification (Release 5)," 3GPP TS 25.321 V5.13.0 (Mar. 2007).
Third Generation Partnership Project, "Technical Specification Group Radio Access Network; Medium Access Control (MAC) protocol specification (Release 5)," 3GPP TS 25.321 V5.14.0 (Sep. 2008).
Third Generation Partnership Project, "Technical Specification Group Radio Access Network; Medium Access Control (MAC) protocol specification (Release 6)," 3GPP TS 25.321 V6.13.0 (Jun. 2007).
Third Generation Partnership Project, "Technical Specification Group Radio Access Network; Medium Access Control (MAC) protocol specification (Release 6)," 3GPP TS 25.321 V6.16.0 (Sep. 2008).
Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).
Third Generation Partnership Project, "Technical Specification Group Radio Access Network; Physical channels and mapping of transport channels onto physical channels (FDD) (Release 4)," 3GPP TS 25.211 V4.6.0 (Sep. 2002).
Third Generation Partnership Project, "Technical Specification Group Radio Access Network; Physical channels and mapping of transport channels onto physical channels (FDD) (Release 5)," 3GPP TS 25.211 V5.8.0 (Dec. 2005).
Third Generation Partnership Project, "Technical Specification Group Radio Access Network; Physical channels and mapping of transport channels onto physical channels (FDD) (Release 6)," 3GPP TS 25.211 V6.8.0 (Sep. 2007).
Third Generation Partnership Project, "Technical Specification Group Radio Access Network; Physical channels and mapping of transport channels onto physical channels (FDD) (Release 6)," 3GPP TS 25.211 V6.9.0 (Nov. 2007).
Third Generation Partnership Project, "Technical Specification Group Radio Access Network; Physical channels and mapping of transport channels onto physical channels (FDD) (Release 7)," 3GPP TS 25.211 V7.6.0 (May 2008).
Third Generation Partnership Project, "Technical Specification Group Radio Access Network; UTRAN Iur Interface User Plane Protocols for Common Transport Channel Data Streams (Release 7)," 3GPP TS 25.425 V7.4.0 (Jun. 2007).
Third Generation Partnership Project; "Technical Specification Group Radio Access Network; UTRAN Iub/Iur interface user plane protocol for DCH data streams (Release 7)," 3GPP TS 25.427 V7.4.0 (Mar. 2007).
Third Generation Partnership Project; "Technical Specification Group Radio Access Network; UTRAN Iub/Iur interface user plane protocol for DCH data streams (Release 8)," 3GPP TS 25.427 V8.0.0 (Mar. 2008).
Third Generation Partnership Project; "Technical Specification Group Radio Access Network; UTRAN Iub/Iur interface user plane protocol for DCH data streams (Release 7)," 3GPP TS 25.427 V7.5.0 (Sep. 2007).
Third Generation Partnership Project; "Technical Specification Group Radio Access Network; UTRAN Iub/Iur interface user plane protocol for DCH data streams (Release 5)," 3GPP TS 25.427 V5.5.0 (Jun. 2005).
Third Generation Partnership Project; "Technical Specification Group Radio Access Network; UTRAN Iub/Iur interface user plane protocol for DCH data streams (Release 6)," 3GPP TS 25.427 V6.8.0 (Dec. 2006).
Third Generation Partnership Project; "Technical Specification Group Radio Access Network; UTRAN Iub/Iur interface user plane protocol for DCH data streams (Release 4)," 3GPP TS 25.427 V4.5.0 (Dec. 2003).
Third Generation Partnership Project; "Technical Specification Group Radio Access Network; UTRAN Iub/Iur interface user plane protocol for DCH data streams (Release 1999)," 3GPP TS 25.427 V3.11.0 (Dec. 2003).
Third Generation Partnership Project; "Technical Specification Group Radio Access Network; UTRAN Iur interface user plane protocols for Common Transport Channel data streams (Release 1999)," 3GPP TS 25.425 V3.8.0 (Dec. 2003).
Third Generation Partnership Project; "Technical Specification Group Radio Access Network; UTRAN Iur interface user plane protocols for Common Transport Channel data streams (Release 4)," 3GPP TS 25.425 V4.4.0 (Dec. 2003).
Third Generation Partnership Project; "Technical Specification Group Radio Access Network; UTRAN Iur interface user plane protocols for Common Transport Channel data streams (Release 5)," 3GPP TS 25.425 V5.8.0 (Jun. 2005).
Third Generation Partnership Prorgam Support Team, "Current Minutes of the 59bis TSG-RAN WG2 Meeting (Shanghai, China, Oct. 8-12, 2007)", TSG-RAN WG2 Meeting #60, R2-7xxxx, (Korea, Nov. 5-9, 2007).
TSG-RAN-WG2, "Reply LS on Enhanced Uplink for CELL_FACH state in FDD," 3GPP TSG-RAN-WG2 Meeting #60, R2-075472 (Nov. 5-9, 2007).
Third Generation Partnership Project, "Technical Specification Group Radio Access Network; Medium Access Control (MAC) protocol specification (Release 7)", 3GGP TS 25.321 V7.3.0 (Dec. 2006).
Third Generation Partnership Project, "Technical Specification Group radio Access Network; UTRAN Iub/Iar interface user plane protocol for DCH data streams," 3GPP TS 25.427 V7.3.0 (Dec. 2006).
Nokia Siemens Networks, On E-DCH Resource Release [Online], 3GPP TSG-RAN WG2#62 | R2-082579, Kansas City, USA, May 5-9, 2008.
Huawei, RLF Back Off for Enhanced Uplink in CELL_FACH State [Online], 3GPP TSG-RAN WG2#63, R2-084415, Aug. 18-22, 2008, Jeju Island, KR.
ETSI TS 125 321 (V7.2.0 (Sep. 2006) Technical Specification Universal Mobile Telecommunications System (UMTS); Medium Access Control (MAC) protocol specification, (3GPP TS 25.321 version 7.2.0 Release 7).
3GPP, Tech Spec. Group Radio Access Network; Physical Channels and Mapping of Transport Channels Onto Physical Channels (FDD) Release 7), TS 25.211, V.7.2.0., May 2007.
Nokia Corporation et al., "Enhanced Uplink for CELL_FACH in 25.321," 3GPP TSG-RAN WG2 Meeting #61, R2-081774, Shenzhen, China (Mar. 31-Apr. 4, 2008).
Third Generation Partnership Project, "3rd Generation Partnership Project; Technical Specification Group Radio Access Network; Radio Interface Protocol Architecture (Release 7)," 3GPP TS 25.301 V7.2.0 (Jun. 2007).
Third Generation Partnership Project, "3rd Generation Partnership Project; Technical Specification Group Radio Access Network; Radio Interface Protocol Architecture (Release 7)," 3GPP TS 25.301 V7.3.0 (Sep. 2007).
Third Generation Partnership Project, "Technical Specification Group Radio Access Network; Radio Interface Protocol Architecture (Release 8)," 3GPP TS 25.301 V8.3.0 (Sep. 2008).
Univeral Mobile Telecommunications System (UMTS); UTRAN Iub interface Node B Application Part (NBAP) signalling (3GPP TS 25.433 version 7.5.0 Release 7), ETSI TS 125 433 V7.5.0 (Jun. 2007).
Univeral Mobile Telecommunications System (UMTS); UTRAN Iub interface Node B Application Part (NBAP)signalling, (3GPP TS 25.433 version 7.6.0 Release 7), ETSI TS 125 433 V7.6.0 (Oct. 2007).
Univeral Mobile Telecommunications System (UMTS); UTRAN Iub interface Node B Application Part (NBAP) signalling (3GPP TS 25.433 version 8.1.0 Release 8), ETSI TS 125 433 V8.1.0 (Oct. 2008).
3GPP TS 25.321 V7.2.0, Sep. 9, 2006, pp. 81-82, pp. 91-93.

(56) References Cited

OTHER PUBLICATIONS

Ericsson et al., "Correction in release of common E-DCH resources," 3GPP TSG-RAN WG2 Meeting #72, R2-106081, (Nov. 2010).
Ericsson et al., "Hybrid ARQ text proposal for Section 7 of TR25.896," TSG-RAN WG1 #31, R1-030208 (Feb. 2002).
Nokia, "Solution on Iur Problem with pre-Rel7 SRNC," 3GPP TSG-RAN WG3 Meeting #55, R3-070278 (Feb. 2007).
Third Generation Partnership Project; Technical Specification Group Radio Access Network; Radio Resource Control (RRC); Protocol Specification (Release 7), 3GPP TS 25.331 V7.5.0 (Jun. 2007).
Third Generation Partnership Project; Technical Specification Group Radio Access Network; Radio Resource Control (RRC); Protocol Specification (Release 8), 3GPP TS 25.331 V8.4.0 (Sep. 2008).
LG Electronics Inc., "Correction to handling of same priority logical channels," 3GPP TSG-RAN WG2 Meeting #53, Tdoc R2-061494, Shanghai, China, (May 8-12, 2006).

\* cited by examiner

METHOD AND APPARATUS FOR TRANSMITTING UPLINK DATA ON UPLINK RESOURCES

CROSS REFERENCE TO RELATED APPLICATIONS

This application is a continuation of U.S. patent application Ser. No. 14/876,337, filed on Oct. 6, 2015, which is a continuation of U.S. patent application Ser. No. 14/319,608, filed Jun. 30, 2014, now known as U.S. Pat. No. 9,313,809, which issued on Apr. 12, 2016, which is a continuation of U.S. patent application Ser. No. 12/238,910 filed Sep. 26, 2008, now known as U.S. Pat. No. 8,774,104, which issued on Jul. 8, 2014, and claims the benefit of U.S. Provisional Application No. 60/975,985 filed on Sep. 28, 2007; U.S. Provisional Application No. 60/982,528 filed on Oct. 25, 2007; U.S. Provisional Application No. 61/018,999, filed on Jan. 4, 2008; U.S. Provisional Application No. 61/025,441 filed on Feb. 1, 2008; U.S. Provisional Application No. 61/038,576 filed on Mar. 21, 2008; U.S. Provisional Application No. 61/074,288 filed on Jun. 20, 2008; and U.S. Provisional Application No. 61/083,409 filed on Jul. 24, 2008, which are incorporated by reference as if fully set forth. U.S. patent application Ser. No. 14/319,608 is also related to U.S. patent application Ser. No. 14/319,975 filed on Jun. 30, 2014, and is incorporated by reference as if fully set forth.

FIELD OF INVENTION

The present application is related to wireless communication.

BACKGROUND

In wireless communications systems, access to radio resources is controlled by a radio network. When a wireless transmit receive unit (WTRU) has data to transmit to the network, the WTRU requires access to the radio resources before transmitting its data payload. In a Third Generation Partnership Project (3GPP) network, the WTRU may transmit on the uplink using a contentious channel known as a random access channel (RACH). Because access to the RACH is contentious, a collision might occur when multiple WTRUs are accessing the resources simultaneously.

The current RACH access procedure in the 3GPP comprises a preamble phase with power ramp-up, followed by channel acquisition information and message transmission for random access. Because the RACH is a shared channel, in order to avoid WTRUs holding the shared radio resource for a long time, only relatively short message payloads are transmitted on the RACH; this leads to a relatively small data rate. The RACH is thus used for the transmission of short control messages. Typically, the WTRUs demanding larger data rates may be configured by the network to use dedicated resources.

The data rate provided by the RACH is sufficient for the transmission of short control messages supporting mostly speech communications, however it may be inefficient for transmission of data messages associated to the new non real-time data services such as internet browsing, e-mail, etc. For such data services, the traffic is ruptured by nature and long periods of inactivity may exist between successive transmissions. For example, applications requiring frequent transmission of keep-alive messages, may result in an inefficient utilization of dedicated resources. In such cases, it may be advantageous for the network to use shared resources for data transmission instead. The difficulty however, resides in the low data rate offered by the RACH.

To overcome these difficulties, it was proposed to use the enhanced dedicated channel (E-DCH) in the CELL_FACH state to increase the data rate of the shared channel.

FIG. 1 is a diagram of an enhanced RACH (E-RACH) access. The E-RACH procedure may include, a RACH preamble phase and an E-RACH message phase. During the initial RACH preamble phase, a WTRU transmits a RACH preamble, it continues transmitting the preamble while ramping up the power of the transmission until it receives an initial resource assignment. The WTRU may also perform collision detection and resolution, if other WTRUs are attempting to access the RACH during this time. Once the WTRU has received permission to access the RACH, the WTRU may transmit data until the resources are released or the WTRU transitions to another state.

As mentioned above, it was proposed to use the E-DCH in a CELL_FACH state to increase the data rate of the shared channel. However, in the current standard, there are no methods to terminate the E-RACH message phase. Accordingly, it would be beneficial to provide a method and apparatus to terminate an E-RACH message phase in an E-RACH.

SUMMARY

A method and an apparatus is provided for terminating an E-RACH message in an E-RACH transmission. Triggers for terminating the E-RACH message are also provided. The actions upon termination of the E-RACH messages or transition to CELL_DCH state are provided in order to release the shared E-DCH resources while in the CELL_FACH state.

A method for terminating an enhanced random access channel (E-RACH) message in an E-RACH transmission determining that a buffer is empty; triggering a transmission of a scheduling information (SI) with the value of total enhanced dedicated channel (E-DCH) buffer status (TEBS) equal to zero; determining last hybrid automatic repeat request (HARQ) data transmission; and releasing the E-DCH resources allocation is provided.

A method for terminating an enhanced random access channel (E-RACH) message in an E-RACH transmission where the network waits until a HARQ buffer is empty and when the SI with a value of zero is received, the resources are released.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

When referred to herein, the term RACH and E-RACH may be used to describe a resource that is selected by a WTRU for uplink contention based access. The term E-RACH resource may also indicate any combination of a scrambling code, a channelization code, a timeslot, an access opportunity, or a signature sequence that are associated to an E-RACH channel in a future system architecture. The term E-RACH may also indicate the use of the E-DCH in CELL_FACH, CELL_PCH, URA_PCH states or Idle mode.

When referred to hereafter, the term enhanced medium access control (MAC)-e/es entities may refer to the MAC entities used to perform E-DCH transmission in the CELL_FACH state, which in release 8 is referred to as MAC-i/is. MAC-e/es and MAC-i/is are the MAC entities that handle the transport channel such as the enhanced dedicated transport channel (E-DCH).

Figure 1:
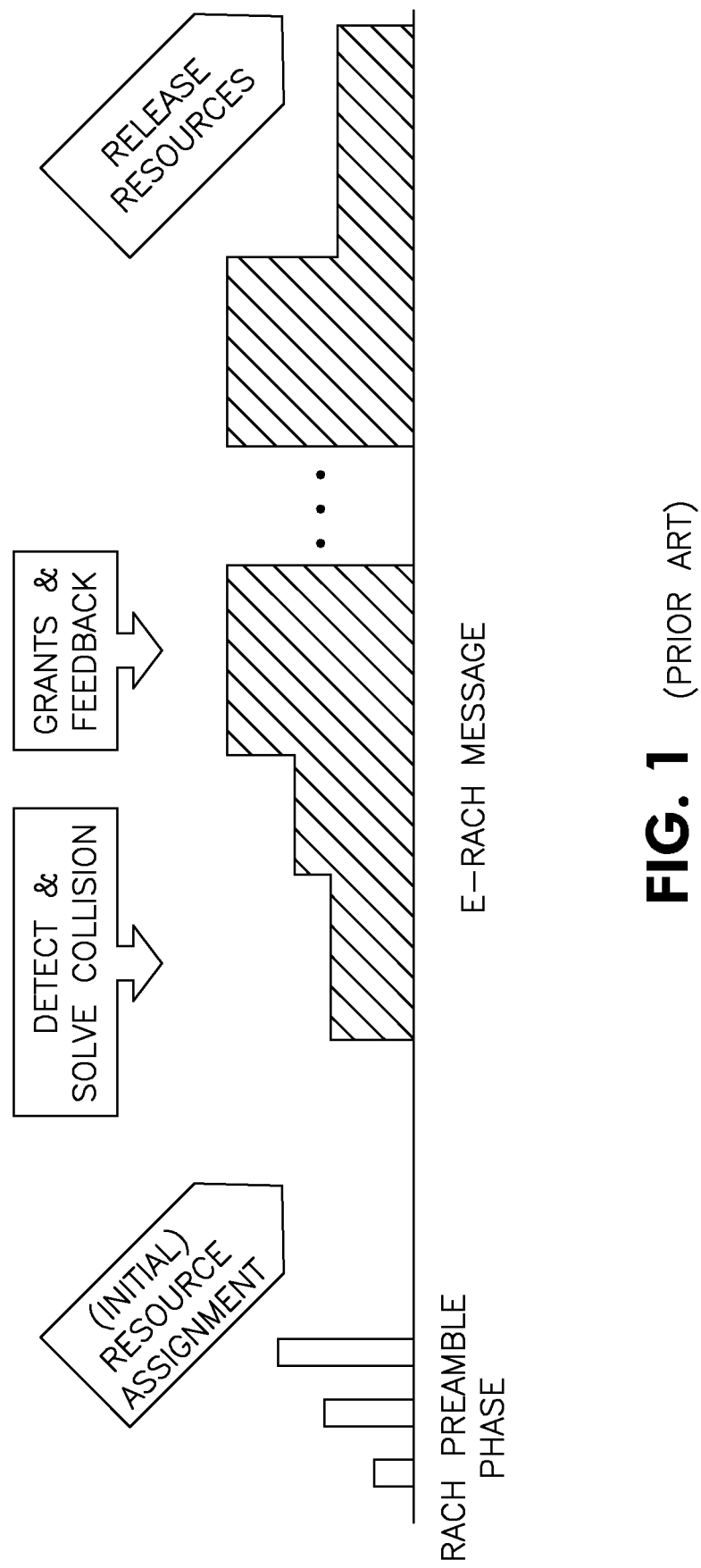
FIG. 1 is a diagram of an E-RACH access with an E-DCH.
Figure 2:
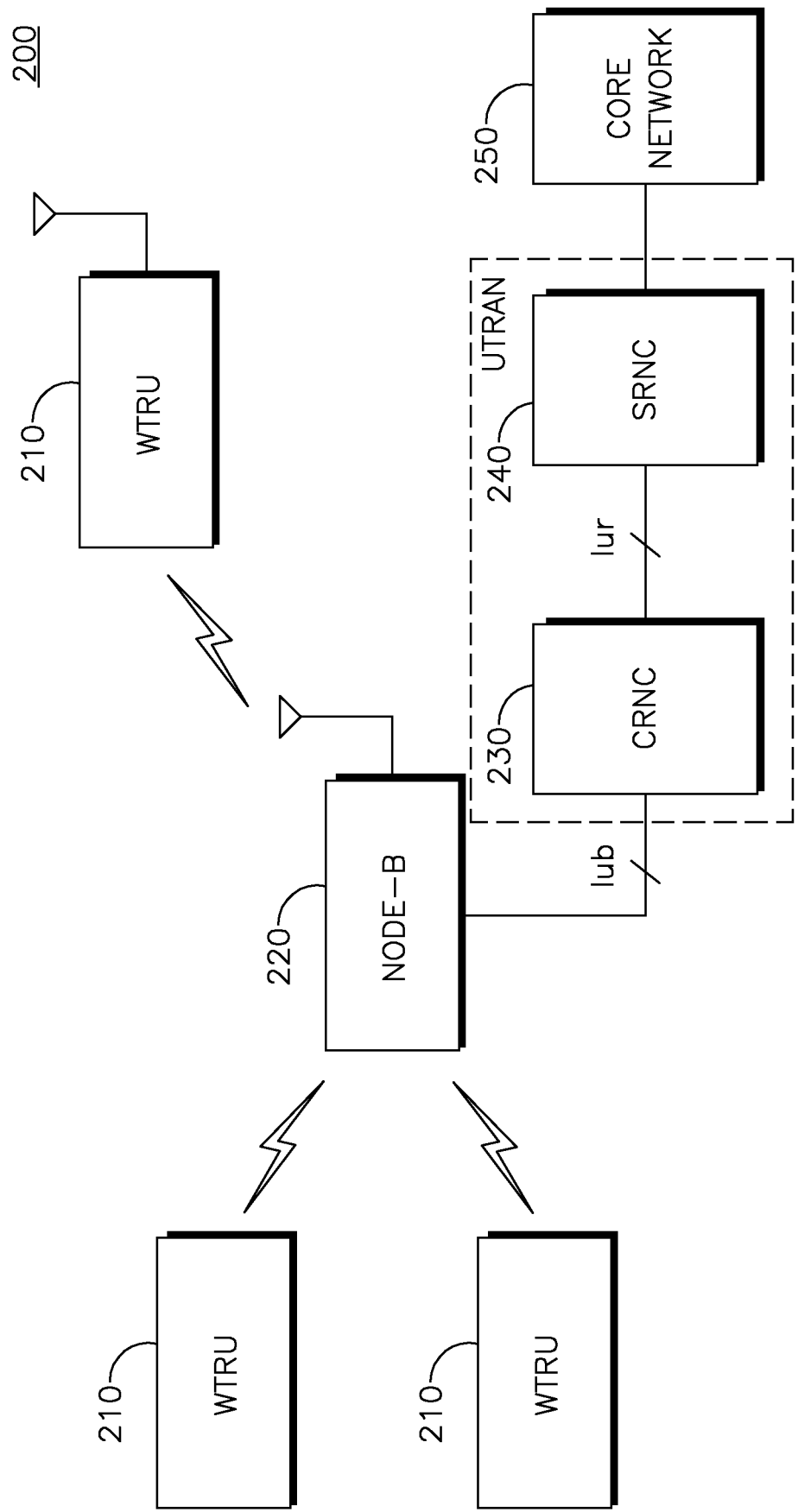
FIG. 2 shows a wireless communication system.

FIG. 2 shows a wireless communication system 200 including a plurality of WTRUs 210, a base station 220, a CRNC 230, an SRNC 240, and a core network 250. As shown in FIG. 2, the WTRUs 210 are in communication with the base station 220, which is in communication with the CRNC 230 and the SRNC 240. Although three WTRUs 210, one base station 220, one CRNC 230, and one SRNC 240 are shown in FIG. 3, it should be noted that any combination of wireless and wired devices may be included in the wireless communication system 200.

Figure 3:
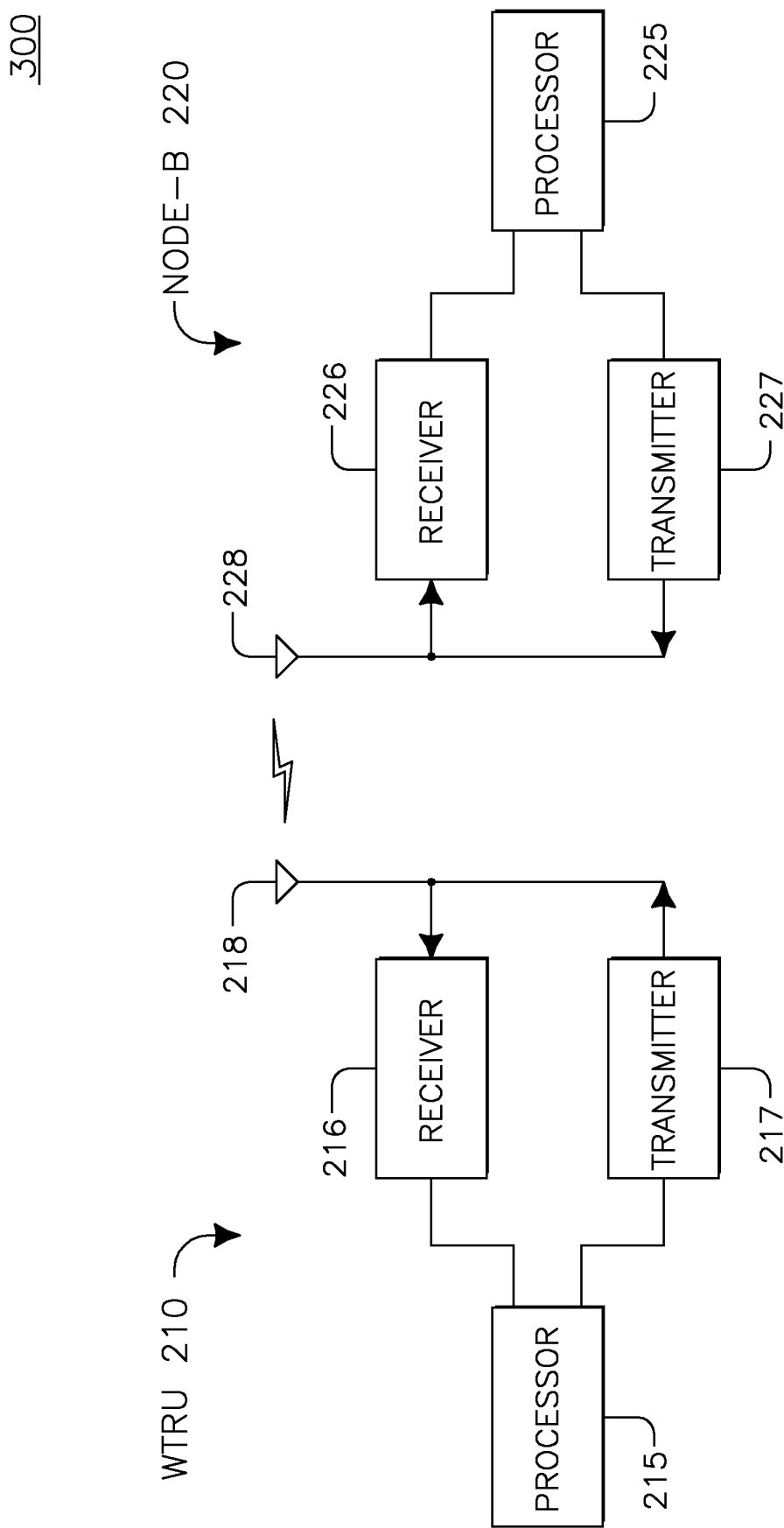
FIG. 3 is a functional block diagram of a WTRU and the base station of the wireless communication system shown in FIG. 2.

FIG. 3 is a functional block diagram 300 of a WTRU 210 and the base station 220 of the wireless communication system 200 of FIG. 2. As shown in FIG. 3, the WTRU 210 is in communication with the base station 220 and both are configured to perform a method to terminate transmission of a message in an E-RACH.

In addition to the components that may be found in a typical WTRU, the WTRU 210 includes a processor 215, a receiver 216, a transmitter 217, and an antenna 218. The processor 215 is configured to perform a method to terminate transmission of a message in an E-RACH. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical base station, the base station 220 includes a processor 225, a receiver 226, a transmitter 227, and an antenna 228. The processor 225 is configured to perform a method to terminate transmission of a message in an E-RACH. The receiver 226 and the transmitter 227 are in communication with the processor 225. The antenna 228 is in communication with both the receiver 226 and the transmitter 227 to facilitate the transmission and reception of wireless data.

Figure 4:
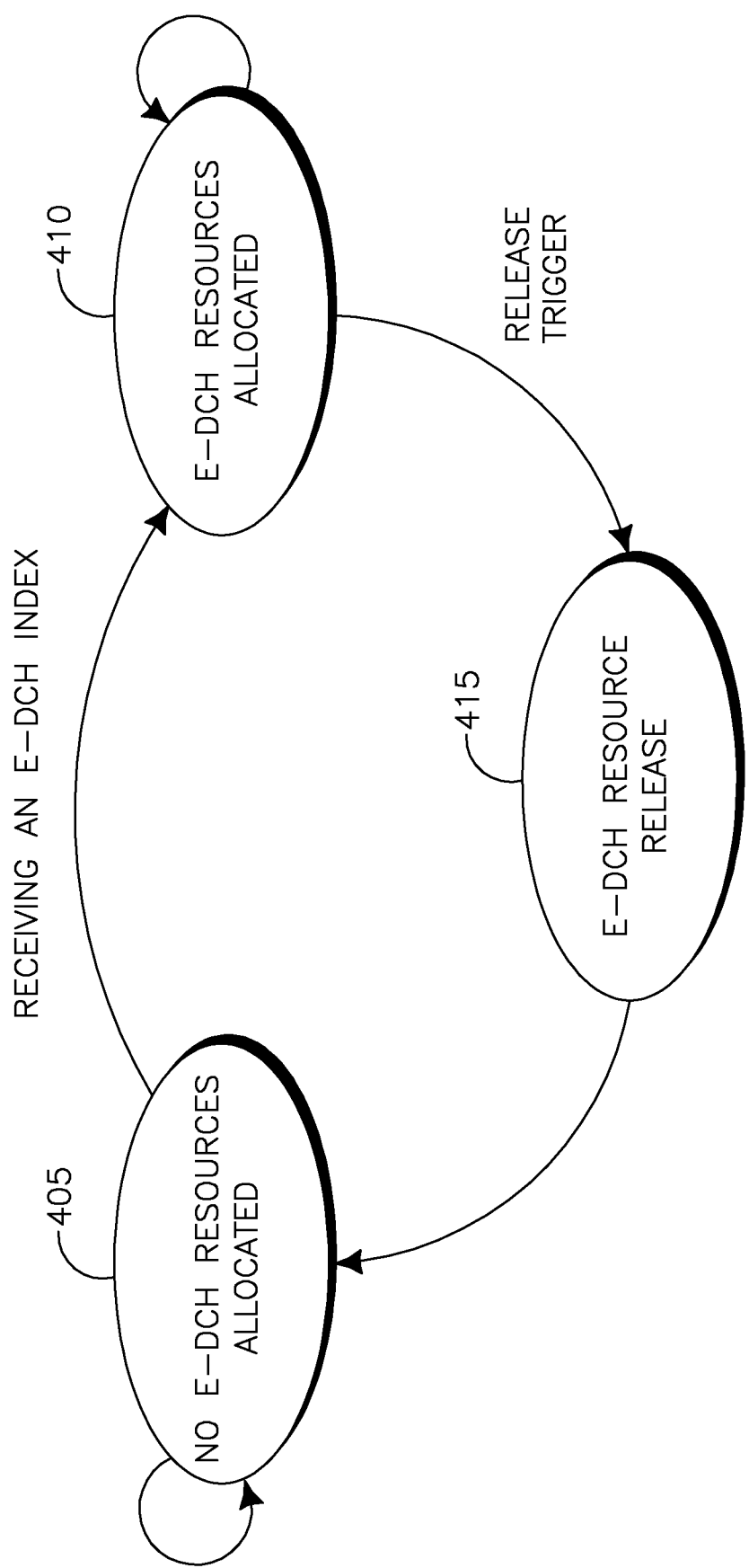
FIG. 4 is a flow diagram of a E-DCH resource allocation and de-allocation.

FIG. 4 is a flow diagram of E-DCH resource allocation and de-allocation 400 using triggering for a WTRU. The first state corresponds to a WTRU 210 that operates with no E-DCH resources allocated to it 405. Once uplink (UL) data has to be transmitted, the WTRU 210 requests E-DCH resources from the network, by transmitting a preamble and waiting for the response on the acquisition indication channel (AICH). In other words, the WTRU 210 may remain in this state until it receives a positive acknowledgement (ACK) on the AICH, or a negative acknowledgement (NACK) on the AICH followed by a resource assignment index over the E-AICH, which may also be referred to as the WTRU 210 receiving an E-DCH index. After receiving the E-DCH resource assignment, the WTRU may transition to the next state wherein E-DCH resources are allocated for enhanced uplink transmissions 410. The WTRU 210 may use these E-DCH resources for UL transmission until it receives a trigger, at which point the WTRU 210 will release the resources 415. After the WTRU 210 releases the resources, it returns to the initial state. As will be described in further detail hereafter, the trigger may be timer based, it may be based on the WTRU buffer status, or may be based on signaling from the RNC or the Node-B 220.

In one embodiment, the WTRU 210 may be configured to include a timer module. The timer module may include multiple timers, wherein a timer may be associated to each logical channel or each MAC-d flow. The timer module may be configured to indicate the maximum allowable transmission time for a logical channel (i.e., dedicated control channel (DCCH), dedicated traffic channel (DTCH), common control channel (CCCH), etc.). The values for the timer module may be preconfigured or signaled to the WTRU 210. The timers may be activated upon the WTRU's 210 first transmission, once an E-DCH resource index is received. The WTRU may be configured to release an E-DCH resource upon expiry of its associated timer. For example, the WTRU 210 may be configured to release a common E-DCH resource when the maximum common E-DCH resource allocation time for the CCCH has been reached. This embodiment would allow the flexibility to configure a smaller transmission time duration for a logical channel such as the CCCH.

The timer module may also be configured based on logical channel identity and the absence of an E-DCH radio network temporary identifier (E-RNTI). More specifically, a maximum E-DCH allocation time may be allocated to the CCCH transmission when an E-RNTI is not present. If the timer expires, and the WTRU 210 that is performing a CCCH transmission does not have the E-RNTI present, the E-RACH access is terminated and the resources are released. If a CCCH transmission is occurring and an E-RNTI is present, (which may occur during period cell update procedure) then the WTRU 210 is not configured to have a maximum E-DCH allocation time and the timer will not affect the WTRU 210.

Alternatively, the network may configure the transmission duration timer based on the presence or absence of an E-RNTI. The WTRU 210 may be configured to have a maximum E-DCH allocation time if it has data (user plane or control plane) to transmit and no E-RNTI is present. Otherwise if an E-RNTI is present the WTRU 210 is not configured with a maximum E-DCH allocation time.

Figure 5:
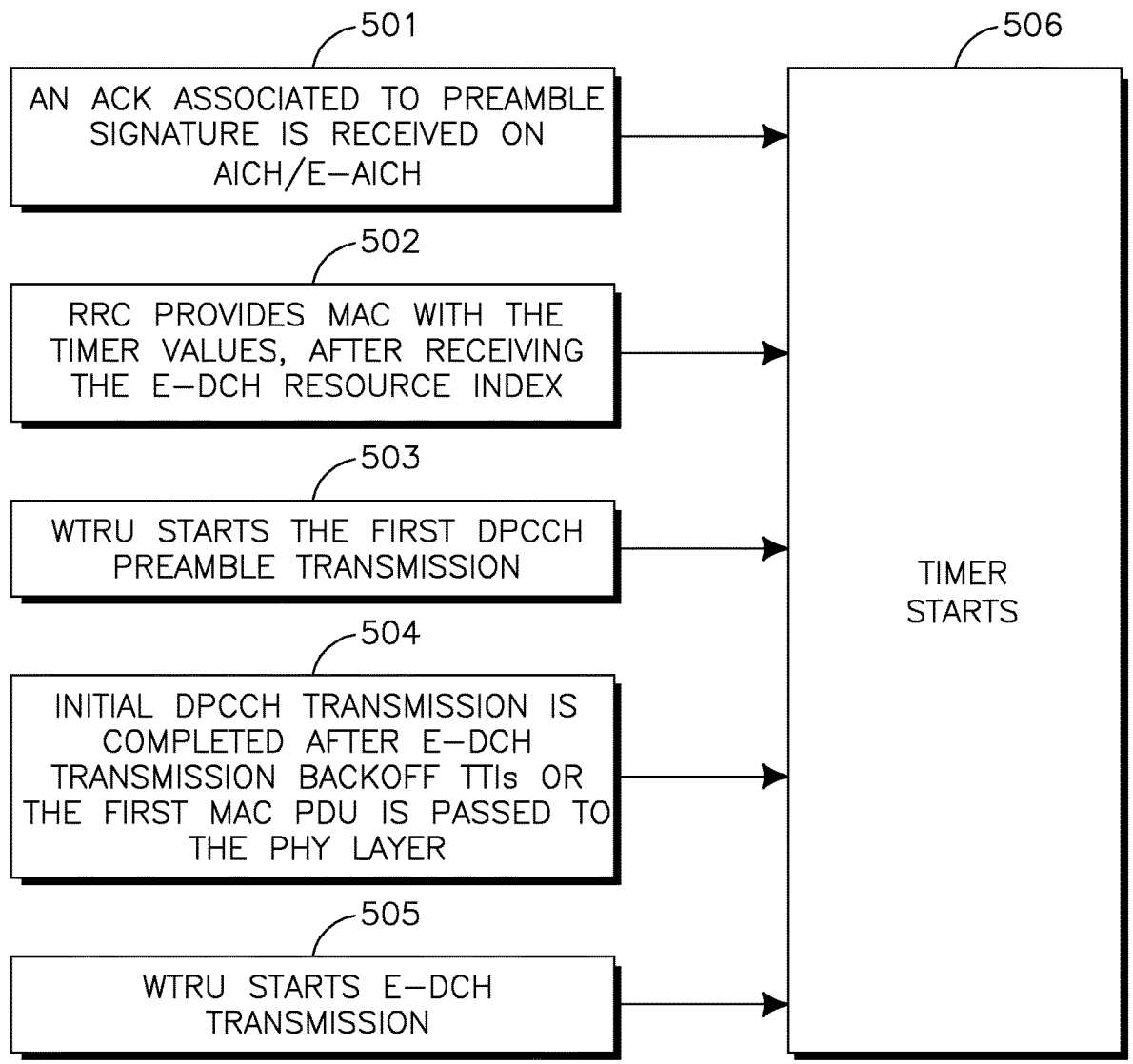
FIG. 5 is a diagram of triggers for starting the timer that the WTRU may initiate for the timers.

FIG. 5 shows a diagram of triggers for starting the timer that the WTRU 210 may initiate for the timers $T_1$ and $T_2$ 500. The timers such as collision resolution $T_1$ and CCCH timer $T_2$ are started according to one of the triggers 501 to 505. This embodiment may include any combination of at least one of the shown trigger 501-505 for starting the timer 506. The timer may start if an ACK associated to the preamble signature transmitted is received on the AICH or E-AICH 501. The timer may start as soon as the radio resource control (RRC) provides the MAC with the timer values, and after receiving the E-DCH resource index 502. The timer may start if the WTRU 210 starts the first dedicated physical control channel (DPCCH) preamble transmission 503. The timer may start when the initial DPCCH transmission is completed after E-DCH transmission backoff transmission time intervals (TTIs) or the first MAC protocol data unit (PDU) is passed to the physical layer 504. Or, the timer may start when the WTRU 210 starts the E-DCH transmission 505. In addition, the WTRU 210 may initiate the timer when the collision resolution E-DCH absolute grant channel (E-AGCH) carrying the WTRU 210 E-RNTI is received. Other triggers may also be used as designed.

Alternatively, the WTRU 210 timer module may be configured such that the length of time available to the WTRU 210 is based on the number of data bits that need to be transmitted. The length of the time variable to the WTRU 210 may also be based on the number of radio link controller (RLC) or MAC PDUs. Additionally, it may also be based on the number of RLC service data units (SDUs).

Alternatively, the E-RACH message duration may be fixed at either 10 msec or 20 msec (as is specified in the current 3GPP standards). As a result, the E-RACH message phase may be active for a maximum number of frames or sub-frames. An E-RACH message duration information element (IE) may be broadcast as part of the system information broadcast (SIB), or may be included as part of L1 signaling. For example, the E-RACH message duration IE may be transmitted with the initial resource assignment or during the collision resolution phase. In addition, the E-RACH message duration may be linked to an access service class.

Alternatively, the WTRU 210 may count the number of transmissions and retransmissions and use the count as a trigger to stop the transmission of the E-RACH message phase. For example, if the WTRU 210 is configured for repeat automatic repeat request (ARQ) type of operation and transmission on consecutive TTIs, then the WTRU may be configured to terminate the transmission of the E-RACH message phase after K retransmissions. It is noted that the value of K may be preconfigured in the WTRU, broadcasted as part of the SIB, or signaled during the E-RACH allocation phase.

Figure 6:
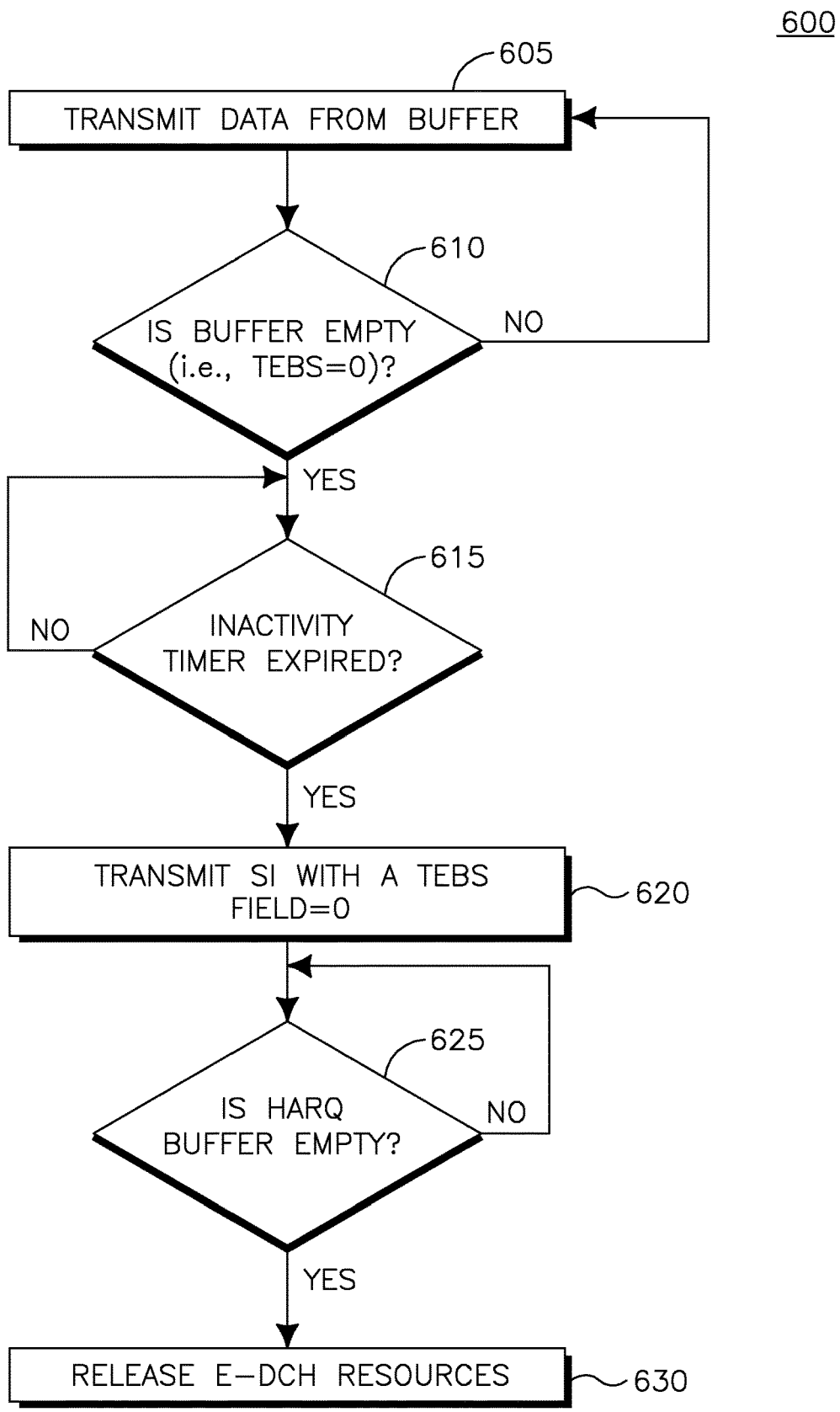
FIG. 6 is a flow diagram of a method to release E-DCH resources based on the status of a WTRU's queue or buffer.

FIG. 6 is a flow diagram of a method to release E-DCH resources based on the status of a WTRU's 210 queue or buffer. When the WTRU 210 has data in the transmit buffer, the WTRU 210 may transmit the data 605. After a transmission, the WTRUs 210 may check if the transmit buffer is empty 610. If the transmit buffer is not empty, then the WTRU 210 will transmit the data that is in the buffer 605. If the transmit buffer is empty 610 (i.e., the Total E-DCH Buffer Status (TEBS) is equal to zero), optionally it is checked if an inactivity timer has expired 615. If the inactivity timer has expired, then the WTRU 210 may be configured to transmit a special or reserved value of the SI where TEBS is set to zero 620. The WTRU 210 may be configured to release E-DCH resource 630 after the inactivity timer has expired 615, wherein the inactivity timer is started once the TEBS is equal to zero. The WTRU 210 is considered to be inactive, if no UL or downlink (DL) traffic has been received. Alternatively, the implicit release timers (i.e., the inactivity timer) may be restarted based on a trigger mechanism when the WTRU 210 decodes its H-RNTI on the high speed shared control channel (HS-SCCH). Once the inactivity timer has expired, the WTRU 210 may be configured to transmit a special or reserved value of the SI 620. For example, the special or reserved value of the SI may comprise a TEBS with a value set to zero 620. The SI with the TEBS set to zero may be used to signal to the network for releasing the resources. After successfully transmitting the SI and emptying the HARQ buffers 625, the WTRU 210 releases the E-DCH resources 630.

Alternatively, the WTRU 210 may transmit a signal to the network indicating to release the resources. The signal may comprise a special combination of the SI and a Happy Bit, a new MAC signaling, where a special combination of MAC header fields may be re-interpreted. Alternatively, a field may be added in the enhanced MAC-e header or MAC-e trailer denoting a request to terminate transmission of the E-RACH message phase. For example, the WTRU 210 may transmit this signal to the network via a reserved data description indicator (DDI) combination. In another alternative, the signal may be a new RRC message; special value of the enhanced transport format combination index (E-TFCI) field in the E-DPCCH or a special combination of the E-DPCCH fields; or, a new L1 message. The final decision to release the resources may be determined by the network; which may indicate the release of resources back to the WTRU 210. Alternatively, the WTRU 210 may simply stop transmission of the E-DCH as a means to indicate the termination of the E-RACH message phase, at which point the network may release the radio resources.

Alternatively, the timer module may be configured to start when the WTRU 210 has transmitted all PDUs which were present when the E-RACH was initiated, or the buffer has passed a predetermined threshold level. The threshold level may be an absolute value or based on a relative measure using the initial queue size.

Releasing the resources upon the transmission of all PDUs in the buffer that pass a predetermined threshold level, may free up the E-RACH resources for other WTRUs 210. For example, the threshold levels may be set to allow the network to tradeoff fairness between WTRUs 210 and transmission delay. These levels may be configured through system information or they may be preconfigured in the WTRU 210.

In addition, there may be procedures for physical layer that may trigger a termination of the E-RACH message transmission. This includes cell reselection and measurements controlled by the FACH measurement occasions or detection of radio link (RL) failure.

Alternatively, the WTRU 210 may suspend all transmission during the measurement occasion. Also, the scheduler at the Node-B 220 may be aware of the measurement occasion and may also suspend any grant, ACK, or NACK downlink transmission. Upon resuming normal operation, the network may optionally transmit an initial grant so that the power control loop may be re-established. Or, the network may wait for an indication from the WTRU 210 using a preamble power ramp or similar procedure. Optionally, the WTRU 210 may indicate the reason for termination in the termination signal or the termination message. Reasons for E-RACH termination may include a RL failure and E-RACH transmission complete.

Figure 7:
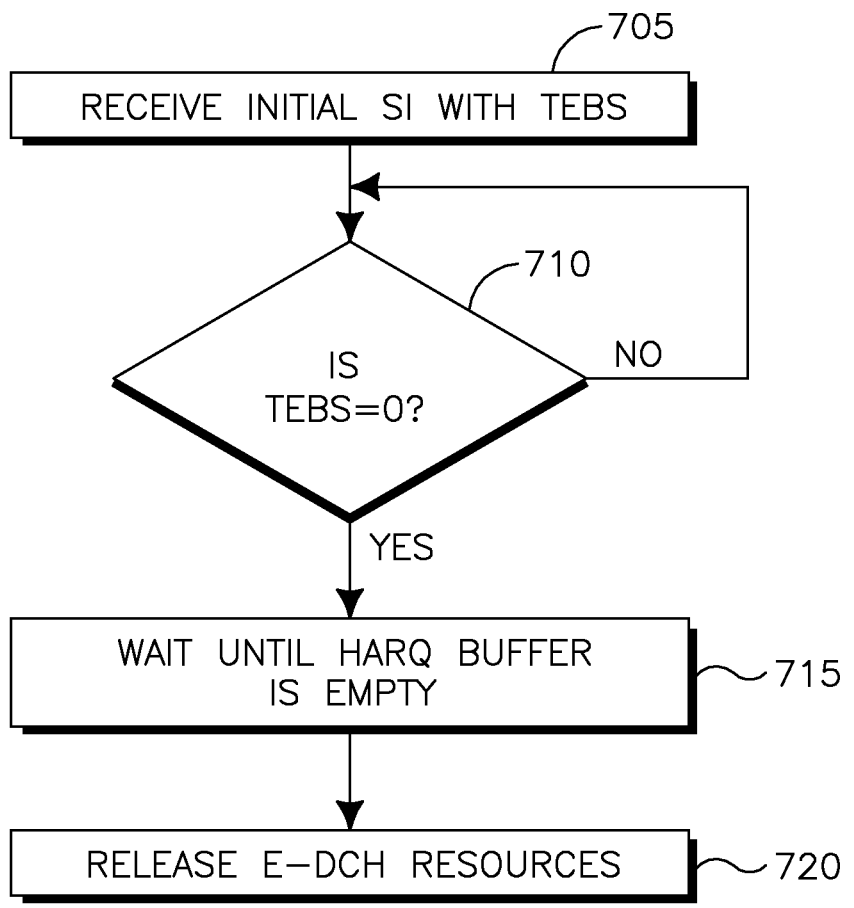
FIG. 7 is a flow diagram of a network configured to determine termination of an E-RACH message transmission.

FIG. 7 shows a flow diagram of a network configured to determine termination of an E-RACH message transmission 700. The termination of the E-RACH message phase may be established by the network based on the reception of the amount of data indicated in an initial SI 705 by the Universal Mobile Telecommunications System (UMTS) Terrestrial Radio Access Network (UTRAN). Alternatively, it may be established based on the UTRAN receiving the amount of data indicated in subsequent SIs or indicated using a different mechanism. The UTRAN may use the values of SI to determine when to terminate the message transmission. More specifically, an SI with TEBS set to zero 710 signals to the network that the WTRU 210 is releasing the resources once the transmission of data in the HARQ buffers is completed. The UTRAN releases E-DCH resources 720 after SI with TEBS set to zero is received and there is no more HARQ transmission 715.

Alternatively, the UTRAN may simply turn off transmission of the associated F-DPCH and explicit additional signaling is not used. This approach may be used in the case where both the WTRU 210 and the network are aware that the transmission is to be terminated.

Alternatively, SI may be transmitted every time the buffer occupancy changes. Alternatively, an SI may be transmitted every time the buffer occupancy changes by a pre-defined or signaled amount (i.e., additional data is received in the buffer), even if the new data is not from higher priority logical channels. If the TEBS is equal to zero then the SI triggering mechanism may be modified to allow the SI to be transmitted. The SI with TEBS set to zero signals to the network that the WTRU is releasing the resources once the transmission of data in the HARQ buffers is completed and the UTRAN also releases the E-DCH resources. Alternatively, an SI may be transmitted in every HARQ transmission when the WTRU 210 is in CELL_FACH state or occupying E-RACH resources.

In another termination option, the UTRAN may explicitly signal the end of the E-RACH transmission. Once the UTRAN determines the end of the E-RACH message transmission, it signals to the WTRU 210 by transmitting a special value over the E-AGCH (e.g., a 0 grant). Or, the UTRAN signals to the WTRU 210 by transmitting an RRC message over the FACH or over the High Speed Downlink Shared channel (HS-DSCH) if the WTRU 210 is configured for HS-DSCH in CELL_FACH state. Alternatively, the network signals to the WTRU 210 by using L1 signaling. This may include stopping the fractional dedicated physical channel (F-DPCH) or transmitting a flag or combination of pre-determined fields on the HS-SCCH if the WTRU 210 is configured for HS-DSCH in CELL_FACH state, for example, using an HS-SCCH order.

Alternatively, the termination of the E-RACH message may be established based on a lack of activity on the enhanced dedicated physical data channel (E-DPDCH) or enhanced DPCCH (E-DPCCH) transmission.

The termination of the E-RACH part may also be established based on the status of the WTRU 210 scheduling requests. As an example, the UTRAN may monitor the received SI or Happy Bit status. If this information indicates low usage, the network may decide to terminate the current transmission of the E-RACH message so that the other WTRUs 210 may have an opportunity to access the resources. Alternatively, if this information indicates high usage and continued need with the Happy Bit set to unhappy, then the UTRAN may decide to transition the WTRU 210 to CELL_DCH state. As another alternative, the UTRAN may use the traffic volume measurement report (such as uplink RRC measurement report) to determine that the WTRU 210 does not have any further data or a small amount of data to transmit.

Alternatively, the UTRAN may implicitly signal the WTRU 210 to release the E-RACH resource by not transmitting predefined physical channels or signals for a predetermined amount of time. In other words, the WTRU 210 releases the E-RACH resources if it does not receive any transmission from the UTRAN on either channel E-AGCH destined to the WTRU 210, E-RGCH associated with E-RACH resource that is used by the WTRU 210, F-DPCH associated with the E-RACH resource that is used by the WTRU 210, and/or, HS-SCCH or high speed physical downlink shared channel (HS-PDSCH) that is destined to the WTRU 210.

Optionally, the UTRAN may indicate the reason for termination in the termination signal or termination message. Reasons for E-RACH termination may include, but are not limited to an RL failure, completion of the E-RACH transmission, and network congestion.

Figure 8:
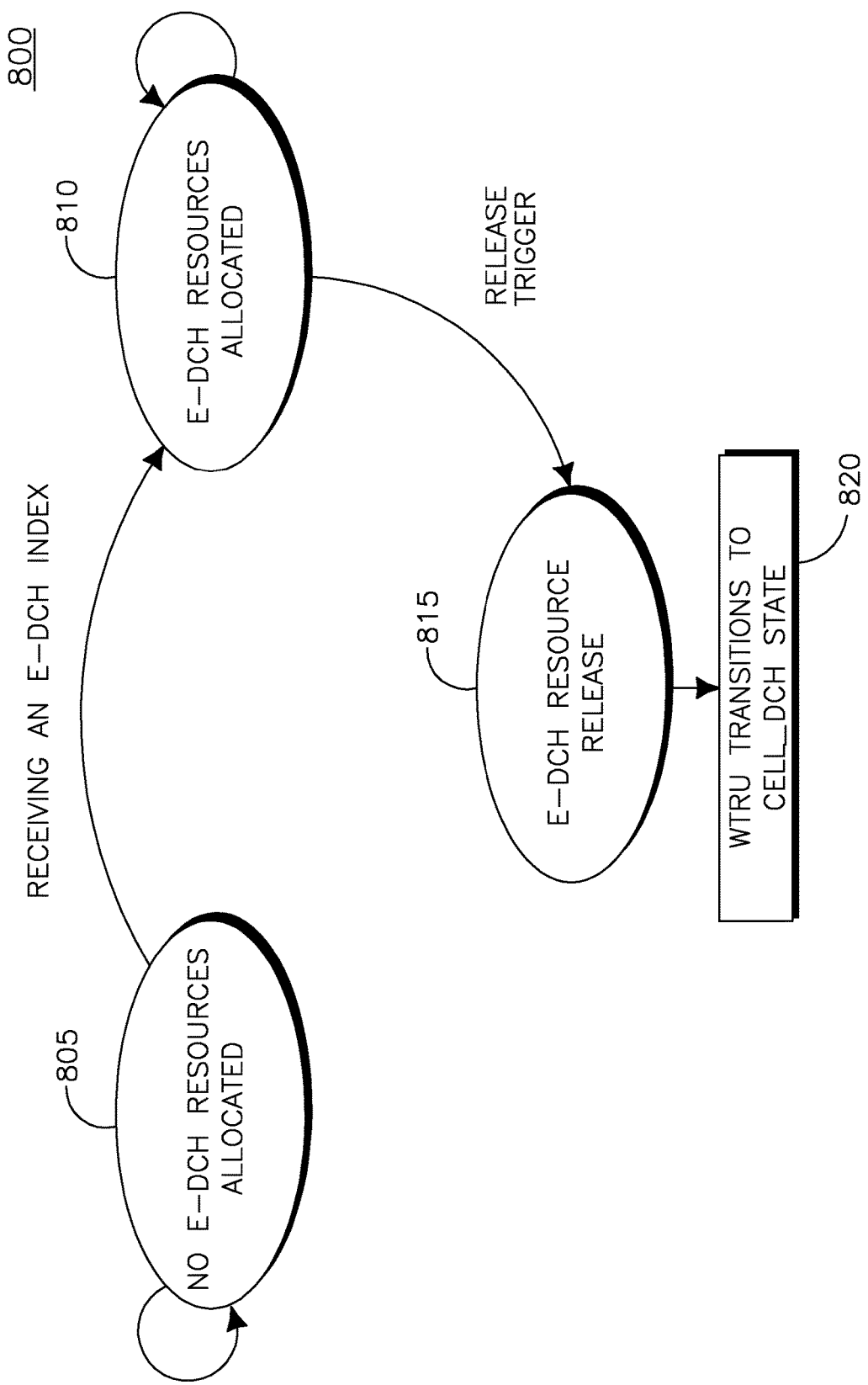
FIG. 8 is a flow diagram of E-DCH resources release when the WTRU transitions from the CELL_FACH state to the CELL_DCH state.

FIG. 8 is a flow diagram of the E-DCH resources released when the WTRU 210 transitions from the CELL_FACH state to the CELL_DCH state. The WTRU 210 operates without any E-DCH resources allocated 805. Upon receiving an E-DCH resource assignment on the AICH or E-AICH or a NACK on the AICH followed by a resource assignment index over the E-AICH, which may also be referred to as the WTRU 210 receiving an E-DCH index, the WTRU 210 may access the E-DCH resources allocated to it in the CELL_FACH state 810. The WTRU 210 retains control of the E-DCH resources until it receives a reconfiguration message, (e.g., via the FACH or the HS-DSCH), indicating that a switch to the CELL_DCH state may be performed. The E-DCH resources are then released 815. And, the WTRU 210 may transition to the CELL_DCH state 820. If the UTRAN reconfigures the WTRU 210 to the CELL_DCH state with dedicated E-DCH resources while the WTRU 210 is transmitting over the E-RACH, then the WTRU 210 may release the E-RACH resources at the activation time that is specified in the reconfiguration message in the case of synchronous reconfiguration. Alternatively, the WTRU 210 may release the E-RACH resources at a fixed delay prior to or after the activation time. Alternatively, the WTRU 210 may release the E-RACH resources immediately upon reception of the RRC reconfiguration message.

Additionally, the WTRU 210 may be configured to release the E-RACH resources at the same time as it configures itself for a transmission over the dedicated E-DCH resources. Alternatively, the WTRU 210 may release the E-RACH resources at a fixed delay prior to or after configuring itself for transmission using the dedicated E-DCH resources; or, release the E-RACH resources once the WTRU 210 is fully synchronized with the UTRAN with the dedicated E-DCH resources.

Figure 9:
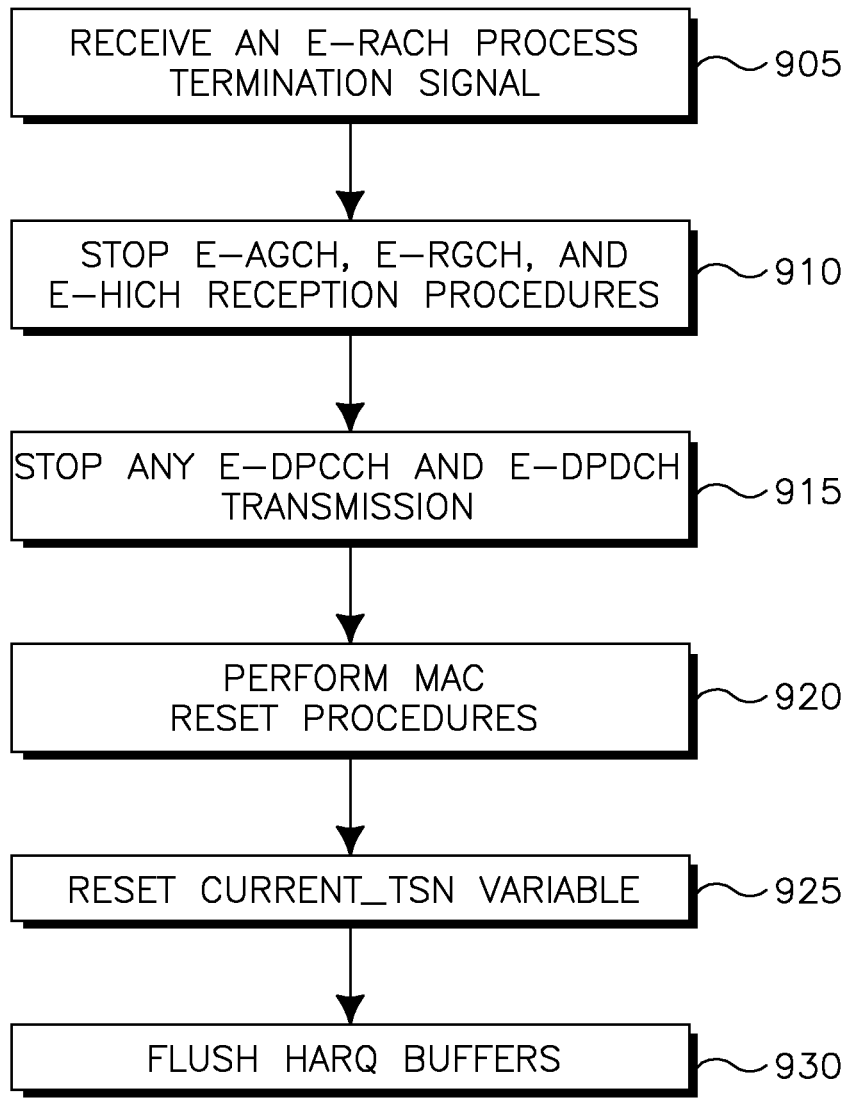
FIG. 9 is a flow diagram for releasing the E-DCH resources while in the CELL_FACH state.

FIG. 9 is a flow chart of a procedure for releasing the E-DCH resources while in the CELL_FACH state or idle mode, when the E-RACH termination triggers occur. The WTRU 210 begins the E-RACH termination process 905. The WTRU 210 may be configured to stop any E-AGCH, E-RGCH, and E-HICH reception procedures that are occurring 910. The WTRU 210 may be further configured to stop any E-DPCCH and E-DPDCH transmission procedures that are occurring 915. The WTRU 210 may then perform a MAC reset procedure 920 and release HARQ buffers 930. The enhanced MAC-e/es reset procedure may include flushing the HARQ processes, discarding any remaining segments in the segmentation entity of the enhanced MAC-e/es and resetting the CURRENT_transmission sequence number (TSN) value to zero. Alternatively, if the remaining segment is from a DTCH or a DCCH logical channel the WTRU 210 may resume transmission of the segment at a remaining process. An indication may be transmitted to the SRNC 240 via Iub signaling to discard any stored segment and reset the TSN reordering numbers.

If the E-DCH has terminated and the DTCH or the DCCH transmission is active, the WTRU 210 may flush the HARQ processes 930 and discard any remaining segments in the segmentation entity of the MAC-i/is.

The other logical channels or queues of the MAC-i/is entity that do not correspond to the CCCH are not reset. The Node-B 220 may be configured to perform a reset of the MAC-is entity of the CCCH. In other words, any segment may be discarded and the expected TSN is set to its initial value. If the MAC-is entity is in the CRNC 230, Node-B 220 uses Iub signaling indicating to the MAC-is entity to perform a reset. In addition, the MAC-i entity associated to the E-DCH resource is reset (i.e., HARQ soft buffers are flushed).

When the WTRU 210 performs a full MAC-i/is reset, the MAC-is entity in the SRNC 240 may be notified via a new Iub/Iur signaling that E-RACH access has been terminated; thus MAC-is entity in the SRNC 240 may also perform a reset. More specifically, when the Node-B 220 terminates the E-DCH connection with the WTRU 210, it releases the E-DCH resources, flushes the HARQ buffers, and notifies the SRNC 240 or CRNC 230 that the connection has been terminated and thus the CRNC 230 or SRNC 240 also perform a reset of the MAC. The CRNC 230 or SRNC 240 is notified via Iub or Iur signaling. A new control bit may be introduced in the Iub or Iur frame format or a new frame format may be defined to signal to the SRNC 240 or CRNC 230 the release of the resources.

Also, optionally, the reset of the MAC-i/is or only discarding of the segments may be performed after a time interval (Tr) because the termination of the E-RACH resource. The timer is also initiated in the network side. Tr may be a system configured timer signaled to the WTRU 210 via RRC message, via system information block (SIB), or preconfigured in the WTRU 210. The timer is initiated as soon as the E-DCH resources are terminated in the WTRU 210.

The WTRU 210 may be configured to stop the timer if it is running and if the WTRU 210 attempts to perform E-RACH access. Also, the WTRU 210 may also stop the timer, if the WTRU 210 attempts the E-RACH access and obtains the E-DCH resources assigned, or the WTRU 210 obtains the E-DCH resources assigned and resolves the contention resolution phase.

Alternatively, the WTRU 210, the Node-B 220 and/or the RNCs may be configured with a TSN_RESET_TIMER, wherein the WTRU 210 is configured to perform a TSN reset when the timer expires. Optionally, the WTRU 210 may perform a full enhanced MAC-e/es reset procedure when the timer expires.

The E-DCH resources are released when a transition from CELL_FACH to CELL_DCH occurs.

The WTRU 210 and the RNC may reset the value of the last used TSN number (i.e., CURRENT_TSN) to the initial value upon the release of the E-DCH resource set being used by the WTRU 210. The WTRU 210 and the RNC may each include synchronized timers, wherein the expiry of the timer signals the release of the E-DCH resources. After the timer expires and the resources are released, the WTRU 210 may reset the TSN and optionally perform a full enhanced MAC-e/es reset procedure.

Alternatively, the UTRAN may order the release of the resources. The UTRAN may signal the WTRU indicating that the resources must be released. In this case, upon reception of the message, the WTRU 210 and UTRAN reset the TSN to an initial value.

Alternatively, the TSN number may be reset upon the expiration of an inactivity timer. In this case, an inactivity timer may be started in both the WTRU 210 and the network after the last MAC-e PDU is transmitted and received, respectively. If the timer expires, the WTRU 210 and the RNC resets the TSN to its initial value. Optionally, a full enhanced MAC-e/es reset procedure may be performed.

In another alternative, the TSN number may not reset. The last TSN values used are stored in memory and continuously incremented for each new transmission, regardless of the E-DCH resource set being used or the time in which the transmission is taking place.

Alternatively, the TSN number may be set to its initial value and optionally a full enhanced MAC-e/es reset may take place when a cell reselection occurs. Resetting the TSN or the MAC-e/es may always occur after the WTRU 210 performs cell reselection. Alternatively, it may only occur when a serving radio network subsystem (SRNS) relocation occurs. The RNC may signal the TSN reset via an explicit enhanced MAC-e/es reset indicator or the WTRU 210 may implicitly detect that SRNS relocation has occurred due to the presence or the change of a new UTRAN RNTI (U-RNTI).

Although features and elements are described above in particular combinations, each feature or element may be used alone without the other features and elements or in various combinations with or without other features and elements. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
a receiver;
a transmitter; and
a processor;
wherein
the receiver and the processor are configured to receive at least one radio resource control (RRC) message indicating uplink resources for WTRU and medium access control (MAC) timer information,
the transmitter and the processor are configured to transmit uplink data based on the indicated uplink resources,
the processor is configured to deactivate the indicated uplink resources in response to a MAC timer expiring, and
the MAC timer is configured based on the MAC timer information indicated by the received RRC message.

2. The WTRU of claim 1 wherein the receiver and the processor are configured to receive an uplink grant associated with the indicated uplink resources and the transmitter and the processor are configured to transmit using the indicated uplink resources based on the grant.

3. The WTRU of claim 2 wherein based on the receipt of the uplink grant, the WTRU does not deactivate the indicated uplink resources.

4. The WTRU of claim 1 wherein the receiver and the processor are configured to receive a deactivation message and the processor is configured to deactivate the uplink resources based on the received deactivation message.

5. The WTRU of claim 1 wherein the MAC timer is based on a number of frames.

6. A method comprising:
receiving, by a wireless transmit/receive unit (WTRU), at least one radio resource control (RRC) message indicating uplink resources for WTRU and medium access control (MAC) timer information;
transmitting, by the WTRU, uplink data based on the indicated uplink resources; and
deactivating, by the WTRU, the indicated uplink resources in response to a MAC timer expiring, wherein the MAC timer is configured based on the MAC timer information indicated by the received RRC message.

7. The method of claim 6 further comprising receiving, by the WTRU, an uplink grant associated with the indicated uplink resources and transmitting, by the WTRU, using the indicated uplink resources based on the grant.

8. The method of claim 7 wherein based on the receipt of the uplink grant, the WTRU does not deactivate the indicated uplink resources.

9. The method of claim 7 further comprising receiving, by the WTRU, a deactivation message and deactivating, by the WTRU, the uplink resources based on the received deactivation message.

10. The method of claim 7 wherein the MAC timer is based on a number of frames.

* * * * *